(12) United States Patent
Miura et al.

(10) Patent No.: US 8,669,841 B2
(45) Date of Patent: Mar. 11, 2014

(54) SEMICONDUCTOR CERAMIC COMPOSITION FOR NTC THERMISTORS

(71) Applicant: Murata Manufacturing Co., Ltd., Nagaokakyo (JP)

(72) Inventors: Tadamasa Miura, Nagaokakyo (JP); Eisuke Tashiro, Nagaokakyo (JP)

(73) Assignee: Murata Manufacturing Co., Ltd., Nagaokakyo-shi, Kyoto-Fu (JP)

( * ) Notice: Subject to any disclaimer, the term of this patent is extended or adjusted under 35 U.S.C. 154(b) by 0 days.

(21) Appl. No.: 13/693,077

(22) Filed: Dec. 4, 2012

(65) Prior Publication Data
US 2013/0229256 A1 Sep. 5, 2013

(30) Foreign Application Priority Data
Mar. 3, 2012 (JP) .................................. 2012-047445

(51) Int. Cl.
*H01C 7/10* (2006.01)

(52) U.S. Cl.
USPC ...................................................... 338/22 R

(58) Field of Classification Search
USPC ...................................................... 338/22 R
See application file for complete search history.

(56) References Cited

U.S. PATENT DOCUMENTS

| | | | |
|---|---|---|---|
| 6,063,311 A * | 5/2000 | Takeuchi et al. | ............ 252/521.2 |
| 7,948,354 B2 | 5/2011 | Miura et al. | |
| 8,192,076 B2 * | 6/2012 | Nawai et al. | .................. 374/121 |
| 2012/0154105 A1 * | 6/2012 | Koto | ........................... 338/22 R |

FOREIGN PATENT DOCUMENTS

| | | |
|---|---|---|
| JP | 08-236308 A | 9/1996 |
| TW | M34129 U | 9/2008 |

OTHER PUBLICATIONS

Machine translation of specification and claims for WO2004008466. Method for manufacturing negative temperature coefficient thermistor and negative temperature coefficient thermistor. MIURA, Tadamasa. Published Jan. 22, 2004.*

\* cited by examiner

*Primary Examiner* — Kyung Lee
(74) *Attorney, Agent, or Firm* — Dickstein Shapiro LLP

(57) ABSTRACT

A semiconductor ceramic composition for use as a component of the body of NTC thermistors contains at least manganese and cobalt as main ingredients and both aluminum and titanium as additional ingredients for resistance adjustment by annealing. It becomes easier to adjust the resistance of the composition by annealing when the titanium content is equal to or lower than about 9.2 parts by weight on a $TiO_2$ basis relative to 100 parts by weight of the main ingredients.

20 Claims, 2 Drawing Sheets

SEMICONDUCTOR CERAMIC COMPOSITION FOR NTC THERMISTORS

BACKGROUND OF THE INVENTION

1. Field of the Invention

The present invention relates to a semiconductor ceramic composition for NTC thermistors, and in particular, a semiconductor ceramic composition for NTC thermistors that contains at least manganese (Mn) and cobalt (Co) as main ingredients.

2. Description of the Related Art

NTC thermistors are used in applications such as temperature detection, and NTC thermistors for temperature detection are required to detect temperatures with high precision or, more specifically, provide deviations of the temperature-resistance value as small as within about ±1%.

There is a problem with the production of NTC thermistors in that the resistance among finished articles varies because of unavoidable variations in manufacturing conditions and other causes. A possible solution is to add heat treatment (annealing) just before the completion of the production of NTC thermistors, as conventional art mentions in paragraph [0011] of Japanese Unexamined Patent Application Publication No. 8-236308. The temperature of annealing for this purpose is usually on the order of 300 to 500° C.

However, annealing may fail to change the resistance of the thermistors to a sufficient extent, depending on the formula of the semiconductor ceramic composition used to make them. For example, the resistance of thermistors based on a composition rich in Co is refractory to annealing and thus annealing cannot be used to adjust the resistance of such thermistors. Ways to adjust the resistance of such thermistors by annealing are therefore in demand.

SUMMARY OF THE INVENTION

Accordingly, it is an object of the present invention to provide a Co-rich semiconductor ceramic composition for NTC thermistors whose resistance can be adjusted or easily adjusted by annealing.

According to preferred embodiments of the present invention, a semiconductor ceramic composition for NTC thermistors contains at least manganese and cobalt as main ingredients and further contains both aluminum and titanium as additional ingredients.

The inventors have found that the resistance of semiconductor ceramic compositions containing manganese and cobalt can be adjusted by annealing when they further contain both aluminum and titanium, and completed the present invention based on these findings. It is important that both aluminum and titanium are present; using only either one alone does not permit the resistance to be adjusted by annealing.

U.S. Pat. No. 7,948,354 describes a semiconductor ceramic composition for NTC thermistors containing at least Mn and Co as main ingredients, and this composition additionally contains titanium (Ti). It points out in column 6 that the prior art had a composition containing Mn, Ni and Al but required a firing temperature of at least 1,250° C. because the Al is resistant to sintering. After replacing the Al with Ti, the firing temperature could be lowered to 900° to 1000° C., the Ni could be replaced by or used with Co, and there was prevention of erosion of the devices by plating.

U.S. Pat. No. 7,948,354 makes no suggestions about resistance adjustment by annealing after sintering.

The molar ratio of the main ingredients, Mn and Co (on a $Mn_3O_4$ and $Co_3O_4$ basis) is generally about 10/90 to 70/30. In preferred embodiments of the present invention, the titanium content is equal to or lower than about 9.2 parts by weight on a $TiO_2$ basis relative to 100 parts by weight of the main ingredients. Limiting the titanium content to such a range narrows the range of the changes in resistance among annealed articles, making it easier to fine-tune the resistance, although it can exceed this amount if the sintering/resistance properties can be tolerated. Other elements can also be present, as described in said U.S. patent.

It has hitherto been impossible or difficult to adjust the resistance of a semiconductor ceramic composition for NTC thermistors based on manganese and cobalt by annealing. Embodiments of the present invention make it possible or easier to do that.

The use of a semiconductor ceramic composition for NTC thermistors according to an embodiment of the present invention improves the production yield of NTC thermistors and allows for simplified control of the production process, thereby reducing the manufacturing cost of NTC thermistors.

Other features, elements, characteristics and advantages of the present invention will become more apparent from the following detailed description of preferred embodiments of the present invention with reference to the attached drawings.

DESCRIPTION OF THE PREFERRED EMBODIMENTS

Figure 1:
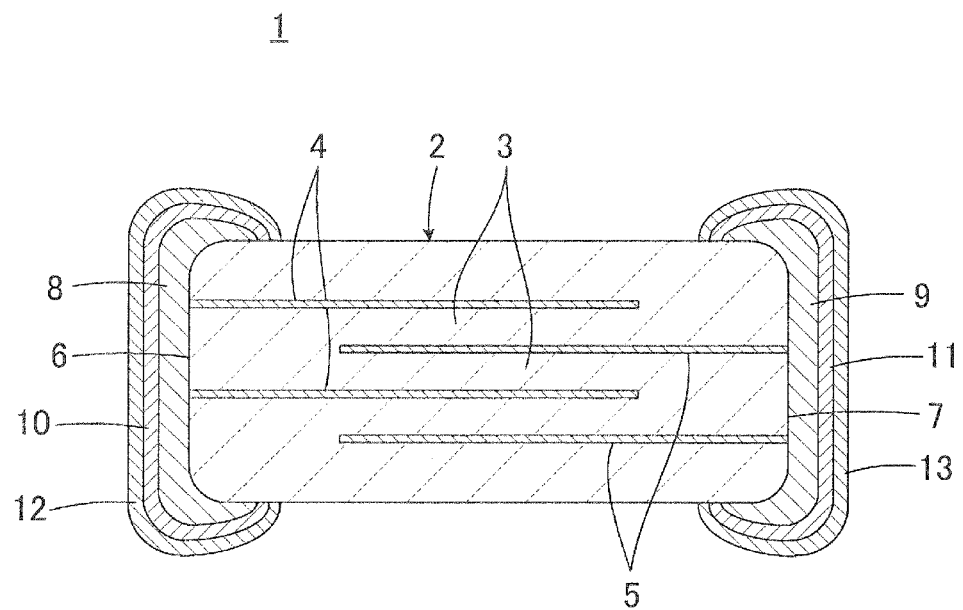
FIG. 1 is a cross-sectional diagram that schematically illustrates a multilayer NTC thermistor constructed using a semiconductor ceramic composition according to an embodiment of the present invention.
Figure 2:
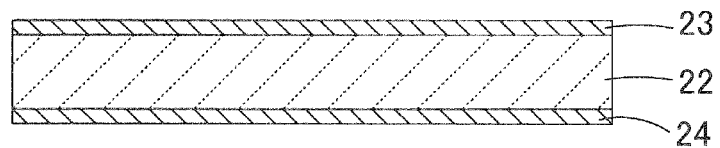
FIG. 2 is a cross-sectional diagram that schematically illustrates a single-plate NTC thermistor constructed using a semiconductor ceramic composition according to an embodiment of the present invention.

Examples of the applications of the semiconductor ceramic compositions according to embodiments of the present invention include the multilayer NTC thermistor 1 and the single-plate NTC thermistor 21 illustrated in FIGS. 1 and 2, respectively. The following describes the structure of the multilayer NTC thermistor 1 and the single-plate NTC thermistor 21 with reference to FIGS. 1 and 2.

As illustrated in FIG. 1, the multilayer NTC thermistor 1 has a semiconductor ceramic body 2 having a substantially rectangular parallelepiped shape. The body 2 has a multilayer structure consisting of multiple layers 3 and contains internal electrodes 4 and 5 formed between some selected layers 3. Examples of materials for use as conductors in the internal electrodes 4 and 5 include silver (Ag), palladium (Pd), and their alloys. The internal electrodes 4 and 5 are grouped into first internal electrodes 4 and second internal electrodes 5, and the first internal electrodes 4 and the second internal electrodes 5 are alternately arranged with respect to the stacking direction. In this way, a structure is provided in which the first and second internal electrodes 4 and 5 face each other with a portion of the body 2 therebetween.

The body 2 also has a first external electrode 8 on one end face 6 and a second external electrode 9 on the other end face 7. These external electrodes 8 and 9 are formed by, for example, printing and firing an electroconductive paste containing Ag, Pd, or their alloy as a conductor. The first internal electrodes 4 extend to one end face 6 of the body 2 and are electrically connected there to the first external electrode 8, and the second internal electrodes 5 extend to the other end face 7 and are electrically connected there to the second external electrode 9.

If necessary, the first and second external electrodes 8 and 9 may be covered with first plating coatings 10 and 11, respectively, made of nickel (Ni) or of a similar material and then with second plating coatings 12 and 13, respectively, made of tin (Sn) or of a similar material.

On the other hand, the single-plate NTC thermistor 21, illustrated in FIG. 2, has a body 22 having a substantially rectangular plate shape and also has first and second electrodes 23 and 24 formed to face each other with the body 22 therebetween.

In the NTC thermistors 1 and 21 constituted as above, the body 2 or 22 is constructed using a semiconductor ceramic composition according to an embodiment of the present invention.

A semiconductor ceramic composition for NTC thermistors according to an embodiment of the present invention contains at least manganese and cobalt as main ingredients. Besides the main ingredients, it contains both aluminum and titanium as additional ingredients so that its resistance can be adjusted or easily adjusted by annealing. This formula makes it possible or easy to adjust the resistance of the semiconductor ceramic composition by annealing. Iron may also be used as an additional main ingredient.

The titanium content is preferably equal to or lower than about 9.2 parts by weight on a $TiO_2$ basis relative to 100 parts by weight of the main ingredients. As demonstrated by experiments described below, this narrows the range of the changes in resistance among annealed articles and makes it easier to fine-tune the resistance.

A typical manufacturing method of the multilayer NTC thermistor 1 illustrated in FIG. 1 is as follows.

First, specified amounts of ceramic raw materials are weighed. The ceramic raw materials used in this method are $Mn_3O_4$, $CO_3O_4$, $Al_2O_3$, and $TiO_2$ powders, and optionally an $Fe_2O_3$ powder. The weighed materials are put into a ball mill and fully wet-ground with a grinding medium composed of zirconia or of a similar material. The obtained particles are calcined at a specified temperature to produce a ceramic powder. The ceramic raw materials may be in the form of carbonates, hydroxides, or other suitable compounds in addition to the oxides listed above.

Specified amounts of an organic binder and water are added to the obtained ceramic powder, and the ingredients are wet-mixed to turn to slurry. The resulting slurry is shaped by the doctor blade method or by a similar method into ceramic green sheets that serve as the individual layers 3 of the body 2.

Then, an electroconductive paste mainly composed of Ag—Pd or of a similar material is applied to each ceramic green sheet by screen printing to form an electroconductive paste film that serves as one of the internal electrodes 4 and 5.

Some of the ceramic green sheets coated with the electroconductive paste film are stacked and crimped, and thereby a multilayer-structured raw laminate is produced that serves as the body 2.

If necessary, this raw laminate is cut to specified dimensions. The raw laminate is then placed in a cell, or sagger made of zirconia or of a similar material, heated until the binder is removed, and then fired. The body 2 is thus obtained.

Subsequently, electroconductive paste mainly composed of Ag or of a similar material is applied to both end faces 6 and 7 of the body 2 and fired to form external electrodes 8 and 9. The obtained external electrodes 8 and 9 are electrolytically plated and thereby covered with first plating coatings 10 and 11 made of Ni or of a similar material and then with second plating coatings 12 and 13 made of Sn or of a similar material.

In this way, the multilayer NTC thermistor 1 illustrated in FIG. 1 is completed.

As for the single-plate NTC thermistor 21 illustrated in FIG. 2, a typical manufacturing method is as follows.

As with the multilayer NTC thermistor 1, a ceramic powder is prepared and turned to slurry. The obtained slurry is shaped by the doctor blade method or by a similar method into ceramic green sheets. These ceramic green sheets are stacked and crimped to achieve a predetermined thickness. A ceramic green compact is thus obtained that serves as the body 22.

Then, electroconductive paste mainly composed of Ag—Pd or of a similar material is applied to both sides of the ceramic green compact by screen printing to form an electroconductive paste film that serves as the electrodes 23 and 24.

If necessary, this ceramic green compact coated with electroconductive paste films is cut to specified dimensions. The ceramic green compact is then placed in a cell, or sagger made of zirconia or of a similar material, heated until the binder is removed, and then fired.

In this way, the single-plate NTC thermistor 21 illustrated in FIG. 2 is completed.

Just before the completion of the production process of the NTC thermistor 1 or 21 described above, or after the completion of at least firing, the resistance is measured and, if necessary, adjusted by annealing the NTC thermistor 1 or 21. The annealing temperature, which is usually on the order of 300 to 500° C., and the annealing time are adjusted depending on the range of changes in resistance required.

The resistance of the single-plate NTC thermistor 21 can also be adjusted by cutting away some portion or a similar trimming approach is possible. In the case of the multilayer NTC thermistor 1, however, it is virtually impossible to adjust the resistance by trimming. This means that the present invention is advantageous particularly to the multilayer NTC thermistor 1 as it becomes possible to adjust the resistance by heat treatment after firing.

The following illustrates some experiments conducted to demonstrate advantages of the present invention. In these experiments, sets of single-plate NTC thermistors like the one illustrated in FIG. 2 were produced as samples.

Experiment 1

Specified amounts of $Mn_3O_4$, $Co_3O_4$, $Fe_2O_3$, $Al_2O_3$, and $TiO_2$ powders (ceramic raw materials) were weighed in accordance with Table. In Table, the columns "$Mn_3O_4$," "$Co_3O_4$," and "$Fe_2O_3$" list the content of each of these compounds (main ingredients) in % by weight, whereas "$Al_2O_3$" and "$TiO_2$" list the weight ratio of each of these compounds in parts by weight with the total amount of $Mn_3O_4$, $Co_3O_4$, and $Fe_2O_3$ as 100 parts by weight.

The weighed materials were put into a ball mill and fully wet-ground with a grinding medium composed of zirconia. The obtained particles were calcined at 900° C. for 2 hours to produce a ceramic powder.

Subsequently, specified amounts of an organic binder and water were added to the ceramic powder, and the ingredients were wet-mixed to turn to slurry. The obtained slurry was shaped by the doctor blade method into ceramic green sheets.

Some of these ceramic green sheets were stacked and crimped to achieve a thickness of about 0.70 mm, and thereby a ceramic green compact was obtained.

After that, an electroconductive paste mainly composed of Ag—Pd was applied to both sides of the ceramic green compact by screen printing to form electroconductive paste films.

This ceramic green compact coated with electroconductive paste films was cut into pieces each having plan dimensions of 2.0 mm×2.0 mm. The cut-out pieces were placed in a zirconia cell, or sagger, maintained at 350° C. for 8 hours so that the binder should be removed, and then fired at 1250° C. In this way, sample single-plate NTC thermistors were obtained.

The obtained sample single-plate NTC thermistors were subjected to a measurement of resistance. More specifically, their direct current resistance in a temperature-controlled liquid bath at 25° C. ($R_{25}$) and that in a temperature-controlled liquid bath at 50° C. ($R_{50}$) were measured, and their specific resistance ($\rho_{25}$) was calculated by the following formula:

$$\rho_{25}[k\Omega \cdot cm] = R_{25} \times a[cm] \times b[cm]/c[cm]/1000$$

where a×b and c represent the plan dimensions and the thickness of the NTC thermistor sample, respectively.

Furthermore, the B-value for the temperature range from 25° C. to 50° C. ($B_{25/50}$) was determined by the following formula:

$$B_{25/50}[K] = \log(R_{25}/R_{50})/\{1/(273.15+25) - 1/(273.15+50)\}.$$

Subsequently, the sample single-plate NTC thermistors were annealed by heating at 450° C. for 8 hours. The resistance at 25° C. of the annealed articles was measured, and the rate of change in resistance before and after heat treatment of the samples was calculated by the following formula:

$$\Delta R/R[\%] = \{(R_{25\text{-}1}) - (R_{25\text{-}0})\}/(R_{25\text{-}0})$$

where $R_{25\text{-}0}$ and $R_{25\text{-}1}$ represent the resistance at 25° C. before annealing and the resistance at 25° C. after annealing, respectively.

The measurements of these $\rho 25$, $B_{25/50}$, and $\Delta R/R$ values are summarized in Table.

values exceeding 2%, demonstrating that their resistance can be adjusted or easily adjusted by annealing.

In particular, samples 9 to 13, in which the $TiO_2$ content was 9.2 parts by weight or less, showed $\Delta R/R$ values ranging from 2.53% to 12.31%; their resistance can be easily fine-tuned. On the other hand, samples 14 and 15, in which the $TiO_2$ content was higher than 9.2 parts by weight, experienced a considerable change in resistance as indicated by absolute $\Delta R/R$ values of 33.21% and 45.67%, respectively. It is therefore preferred that the $TiO_2$ content is equal to or lower than about 9.2 parts by weight when fine-tuning of the resistance is required.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A semiconductor ceramic composition for NTC thermistors comprising a sintered semiconductor ceramic composition comprising:
   manganese and cobalt as main ingredients; and
   both aluminum and titanium as additional ingredients.

2. The semiconductor ceramic composition for NTC thermistors according to claim 1, wherein
   the titanium is present in an amount of about 9.2 parts by weight or less on a $TiO_2$ basis relative to 100 parts by weight of the main ingredients.

3. The semiconductor ceramic composition for NTC thermistors according to claim 2, additionally containing iron.

4. The semiconductor ceramic composition for NTC thermistors according to claim 1, additionally containing iron.

TABLE

| | $Mn_3O_4 + Co_3O_4 +$ | | | Relative amount to $Mn_3O_4 +$ $Co_3O_4 + Fe_2O_3 = 100$ | | Electrical properties measured | | |
| | $Fe_2O_3 = 100$ wt % | | | parts by weight | | | | $\Delta R/R$ after 8- |
| Sample No. | $Mn_3O_4$, wt % | $Co_3O_4$, wt % | $Fe_2O_3$, wt % | $Al_2O_3$, parts by weight | $TiO_2$, parts by weight | $\rho_{25}$, $k\Omega \cdot cm$ | $B_{25/50}$, K | hour annealing at 450° C., % |
|---|---|---|---|---|---|---|---|---|
| 1* | 32.2 | 50.9 | 16.9 | 14.0 | — | 21.4 | 4475 | 0.66 |
| 2* | 32.2 | 50.9 | 16.9 | 17.0 | — | 43.4 | 4609 | 0.81 |
| 3* | 32.2 | 50.9 | 16.9 | 20.0 | — | 86.9 | 4742 | 0.89 |
| 4* | 32.2 | 50.9 | 16.9 | 23.0 | — | 174.6 | 4873 | 0.72 |
| 5* | 32.2 | 50.9 | 16.9 | — | 6.0 | 2.4 | 3829 | 1.11 |
| 6* | 32.2 | 50.9 | 16.9 | — | 9.0 | 5.6 | 3961 | 1.57 |
| 7* | 32.2 | 50.9 | 16.9 | — | 12.0 | 13.7 | 4113 | 1.67 |
| 8* | 32.2 | 50.9 | 16.9 | — | 15.0 | 60.2 | 4380 | 1.34 |
| 9 | 32.2 | 50.9 | 16.9 | 14.0 | 2.6 | 56.2 | 4569 | 2.53 |
| 10 | 32.2 | 50.9 | 16.9 | 14.0 | 4.8 | 108.1 | 4681 | 4.61 |
| 11 | 32.2 | 50.9 | 16.9 | 14.0 | 5.3 | 122.9 | 4702 | 4.91 |
| 12 | 32.2 | 50.9 | 16.9 | 14.0 | 7.9 | 437.1 | 4904 | 9.06 |
| 13 | 32.2 | 50.9 | 16.9 | 14.0 | 9.2 | 1005.3 | 5005 | 12.31 |
| 14 | 32.2 | 50.9 | 16.9 | 14.0 | 10.5 | 2053.5 | 5140 | −33.21 |
| 15 | 32.2 | 50.9 | 16.9 | 14.0 | 13.2 | 8241.5 | 5281 | −45.67 |

In Table, the asterisk mark (*) appended to the sample number denotes that the sample is outside the scope of the present invention.

Samples 1 to 8 contained only one of the additional ingredients, either $Al_2O_3$ or $TiO_2$, and thus are outside the scope of the present invention. Their rates of change in resistance, $\Delta R/R$, were less than 2%, indicating that it is virtually impossible to adjust their resistance by annealing.

On the other hand, samples 9 to 15, which contained the two additional ingredients, both $Al_2O_3$ and $TiO_2$, and thus fall within the scope of the present invention, exhibited $\Delta R/R$ 5. The NTC semiconductor ceramic according to claim 3, wherein the ceramic has a direct current resistance at 25° C. after annealing at a temperature of 300° C. to 500° C. which is at least 2.5% greater than before the annealing.

6. The semiconductor ceramic according to claim 5, wherein the weight ratio of aluminum to titanium measured as $Al_2O_3$ to $TiO2$ is about 5.4 to 1.

7. The NTC semiconductor ceramic according to claim 2, wherein the ceramic has a direct resistance at 25° C. after annealing at a temperature of 300° C. to 500° C. which is at least 2.5% greater than before the annealing.

8. The semiconductor ceramic according to claim 7, wherein the weight ratio of aluminum to titanium measured as $Al_2O_3$ to $TiO2$ is about 5.4 to 1.

9. The NTC semiconductor ceramic according to claim 1, wherein the ceramic has a direct current resistance at 25° C. after annealing at a temperature of 300° C. to 500° C. which is at least 2.5% greater than before the annealing.

10. The semiconductor ceramic according to claim 9, wherein the weight ratio of aluminum to titanium measured as Al2O3 to TiO2 is about 5.4 to 1.

11. The semiconductor ceramic according to claim 1 which has been annealed at a temperature of 300° C. to 500° C. and has a direct current resistance at 25° C. which is at least 2.5% greater than before the annealing.

12. The semiconductor ceramic according to claim 11, wherein the weight ratio of aluminum to titanium measured as Al2O3 to TiO2 is about 5.4 to 1.

13. The semiconductor ceramic according to claim 2 which has been annealed at a temperature of 300° C. to 500° C. and has a direct current resistance at 25° C. which is at least 2.5% greater than before the annealing.

14. The semiconductor ceramic according to claim 13, wherein the weight ratio of aluminum to titanium measured as Al2O3 to TiO2 is about 5.4 to 1.

15. The semiconductor ceramic according to claim 3 which has been annealed at a temperature of 300° C. to 500° C. and has a direct current resistance at 25° C. which is at least 2.5% greater than before the annealing.

16. The semiconductor ceramic according to claim 15, wherein the weight ratio of aluminum to titanium measured as Al2O3 to TiO2 is about 5.4 to 1.

17. An NTC thermistor comprising a layer of the semiconductor ceramic according to claim 4 sandwiched between a pair of electrodes.

18. An NTC thermistor comprising a layer of the semiconductor ceramic according to claim 3 sandwiched between a pair of electrodes.

19. An NTC thermistor comprising a layer of the semiconductor ceramic according to claim 2 sandwiched between a pair of electrodes.

20. An NTC thermistor comprising a layer of the semiconductor ceramic according to claim 1 sandwiched between a pair of electrodes.

* * * * *